(12) United States Patent
Shaw et al.

(10) Patent No.: US 11,097,672 B2
(45) Date of Patent: Aug. 24, 2021

(54) CLIPLESS ROOF DITCH MOLDING, ROOF DITCH MOLDING ASSEMBLY THEREWITH AND METHODS OF ASSEMBLY AND CONSTRUCTION THEREOF

(71) Applicant: Magna Exteriors Inc., Concord (CA)

(72) Inventors: Kelso C. F. Shaw, Richmond Hill (CA); Emil Chiru, Newmarket (CA); Christopher Marsh, Stouffville (CA)

(73) Assignee: Magna Exteriors Inc. Com, Concord (CA)

( * ) Notice: Subject to any disclaimer, the term of this patent is extended or adjusted under 35 U.S.C. 154(b) by 94 days.

(21) Appl. No.: 16/381,154

(22) Filed: Apr. 11, 2019

(65) Prior Publication Data
US 2020/0324715 A1    Oct. 15, 2020

(51) Int. Cl.
*B60R 13/04*    (2006.01)
*F16B 21/08*    (2006.01)

(52) U.S. Cl.
CPC ............ *B60R 13/04* (2013.01); *F16B 21/088* (2013.01)

(58) Field of Classification Search
CPC .............................. B60R 13/04; F16B 21/088
See application file for complete search history.

(56) References Cited

U.S. PATENT DOCUMENTS

2015/0210228 A1*  7/2015  Bach ....................... B60R 13/07
296/213

* cited by examiner

*Primary Examiner* — D Glenn Dayoan
*Assistant Examiner* — Melissa Ann Bonifazi
(74) *Attorney, Agent, or Firm* — Dickinson Wright PLLC

(57) ABSTRACT

A roof ditch molding, roof ditch molding assembly, method of constructing a roof ditch molding, and method of assembling a roof ditch molding into a roof ditch of a vehicle are provided. The roof ditch molding includes an elongate metal substrate having an outer surface and an inner surface with opposite edge regions extending along a direction of a longitudinal axis between opposite ends. The inner surface faces and delimits an elongate channel extending between the opposite ends. The opposite edge regions are spaced from one another for snapping receipt of a plurality of fasteners therebetween, thereby eliminating the need for supplemental fastening features to fixedly secure the roof ditch molding within the roof ditch.

13 Claims, 4 Drawing Sheets

CLIPLESS ROOF DITCH MOLDING, ROOF DITCH MOLDING ASSEMBLY THEREWITH AND METHODS OF ASSEMBLY AND CONSTRUCTION THEREOF

FIELD OF THE DISCLOSURE

The present disclosure relates generally to roof ditch molding for vehicles, and more particularly to clipless roof ditch molding and to methods of manufacture of roof ditch molding.

BACKGROUND OF THE DISCLOSURE

This section provides background information which is not necessarily prior art to the inventive concepts associated with the present disclosure.

Roof ditch molding for vehicles is known in the art. Generally, roof ditch molding extends lengthwise along opposite sides of a vehicle roof to blend or merge the vehicle roof with side panels of the vehicle. Generally, opposite lengthwise extending edges of the roof, extending from a front edge of the roof to a rear edge of the roof, and uppermost edges of the side panels are fixed to one another along a recessed trough, referred to as a roof ditch, and molding, referred to as "roof ditch molding," is disposed in the roof ditch to prevent the ingress of water and for aesthetic purposes.

Typically, roof ditch molding is molded entirely from plastic and is fixed within the ditch via a combination of secondary fastening features. The fastening features are typically provided including a plurality of plastic fastener clips that are fixed to the roof to extend upwardly within the roof ditch in predetermined spaced relation from one another and separate metal clips are fixed within molded plastic receptacles of the molded roof ditch molding, with the molded plastic receptacles being spaced to match the spacing of the plastic fastener clips so that the metal clips align with the plastic fastener clips for attachment thereto. In this arrangement, spacing of the molded plastic receptacles and separate metal clips therein must precisely match the spacing of the plastic fastener clips, otherwise problems will result in assembly, as the respective fasteners could be misaligned with one another. Further yet, the metal clips must be maintained in inventory and added assembly steps are required to first fix the metal clips in the molded plastic receptacles before the roof ditch molding can be fixed to the plastic fastener clips. Accordingly, added component and assembly costs are introduced by having to fix the plastic roof ditch molding to the plastic fastener clips via separately inventoried and assembled metal clips.

In addition to the issues related to manufacture, assembly and cost discussed above, with the roof ditch molding being molded entirely of plastic, strength, durability and appearance issues generally arise over time. As the plastic ages, outgassing causes plastic molding to harden and become embrittled, thereby becoming subjected to cracking, chipping and discoloration. As a result, leaks can arise and aesthetics can be compromised, thereby necessitating replacement or servicing of the roof ditch molding.

The present disclosure addresses these issues, along with others, as will be readily appreciated by one possessing ordinary skill in the art upon viewing the entirety of the disclosure herein.

SUMMARY OF THE DISCLOSURE

This section provides a general summary of the disclosure and is not intended to be a comprehensive listing of all features, advantages, aspects and objectives associated with the inventive concepts described and illustrated in the detailed description provided herein.

The present disclosure provides a roof ditch molding including an elongate metal substrate having an outer surface and an inner surface with opposite edge regions extending along a direction of a longitudinal axis between opposite ends. The inner surface faces and delimits an elongate channel extending between the opposite ends. The opposite edge regions are spaced from one another for snapping receipt of a plurality of fasteners therein. Accordingly, supplemental fastening features to fixedly secure the roof ditch molding within a roof ditch of a vehicle are not needed.

In accordance with another aspect of the disclosure, a polymeric material can be bonded to the outer surface of the metal substrate.

In accordance with another aspect of the disclosure, the polymeric material bonded to the outer surface can be a thermoplastic material.

In accordance with another aspect of the disclosure, the polymeric material bonded to the outer surface can be polyvinylchloride.

In accordance with another aspect of the disclosure, a pair of flexible seal lips can be formed to extend between the opposite ends and outwardly from the outer surface of the wall to facilitate forming a seal between the roof ditch molding and a roof ditch of the vehicle.

In accordance with another aspect of the disclosure, the pair of flexible seal lips can be co-extruded with the polymeric material bonded to the outer surface.

In accordance with another aspect of the disclosure, the opposite edge regions can be configured to converge toward one another to free edges to facilitate snapping fixation of the roof ditch molding to fasteners fixed within the roof ditch of the vehicle.

In accordance with another aspect of the disclosure, the elongate metal substrate can be formed having an intermediate region configured to face upwardly to form a portion of a roof line and having opposite sidewalls extending in oblique relation from the intermediate region in laterally spaced relation from one another, with the sidewalls extending between the intermediate portion and the opposite edge regions, with the opposite edge regions extending from the side walls upwardly toward the intermediate region to the free edges.

In accordance with another aspect of the disclosure, a roof ditch molding assembly is provided. The assembly includes an elongate metal substrate having an outer surface and an inner surface with opposite edge regions extending along a direction of a first longitudinal axis between opposite ends. The inner surface faces and delimits an elongate channel extending between the opposite ends, with the opposite edge regions being spaced from one another a first width. The assembly further includes a plurality of fasteners, with each fastener extending along a second longitudinal axis generally transverse to the first longitudinal axis between opposite first and second ends, with the first end being configured for attachment to a vehicle roof and the second end having an end region with a second width extending generally transversely to the second longitudinal axis, with the second width being greater than the first width. The end region is configured for snapping receipt between the opposite edge regions into the elongate channel along a direction transverse to the first longitudinal axis.

In accordance with another aspect of the disclosure, a method of constructing a roof ditch molding is provided. The method includes forming an elongate metal substrate having an outer surface and an inner surface with opposite edge regions extending along a direction of a first longitudinal axis between opposite ends; forming the inner surface to face and delimit an elongate channel extending between the opposite ends; and spacing the opposite edge regions from one another for resilient snapping receipt of an end of a fastener into the elongate channel.

In accordance with another aspect of the disclosure, the method can further include forming the elongate metal substrate in an extrusion process.

In accordance with another aspect of the disclosure, the method can further include forming the elongate metal substrate in a roll forming process.

In accordance with another aspect of the disclosure, the method can further include bonding a polymeric material to the outer surface of the elongate metal substrate.

In accordance with another aspect of the disclosure, the method can further include bonding the polymeric material to the outer surface of the elongate metal substrate in an extrusion process.

In accordance with another aspect of the disclosure, the method can further include co-extruding a pair of seal lips extending between the opposite ends and outwardly from the outer surface of the elongate metal substrate from the polymeric material.

In accordance with another aspect of the disclosure, a method of assembling a roof ditch molding in a roof ditch of a vehicle is provided. The method includes providing an elongate metal substrate having an inner surface and an outer surface extending along a direction of a longitudinal axis between opposite ends. Further, providing the elongate metal substrate having an intermediate region and opposite sidewalls extending away from the intermediate region in laterally spaced relation from one another to opposite edge regions, with the opposite edge regions extending from the opposite sidewalls upwardly toward the intermediate region, and the inner surface facing and delimiting an elongate channel extending between the opposite ends, with the opposite edge regions being spaced from one another a first width. Further, fixing a plurality of fasteners within the roof ditch, with the fasteners extending to a free end region. Then, pressing the elongate metal substrate into the roof ditch and snapping the free end regions of the plurality of fasteners between the opposite edge regions and into the elongate channel.

In accordance with another aspect of the disclosure, the method of assembling a roof ditch molding in a roof ditch of a vehicle can further include deflecting the opposite edge regions resiliently outwardly away from one another with the end regions of the fasteners and extending the end regions of the fasteners beyond the opposite edge regions to allow the opposite edge regions to spring resiliently inwardly toward one another to capture the end regions of the fasteners in the elongate channel and retain the elongate metal substrate in fixed relation within the roof ditch.

In accordance with another aspect of the disclosure, the method of assembling a roof ditch molding in a roof ditch of a vehicle can further include fixing the elongate metal substrate to the fasteners without supplemental fastening features other than the fasteners initially fixed to the roof.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and other features, benefits and advantages of the present disclosure will become more readily appreciated as the same becomes better understood by reference to the following detailed description, appended claims and accompanying drawings, wherein:

DETAILED DESCRIPTION OF THE DISCLOSURE

Figure 1:
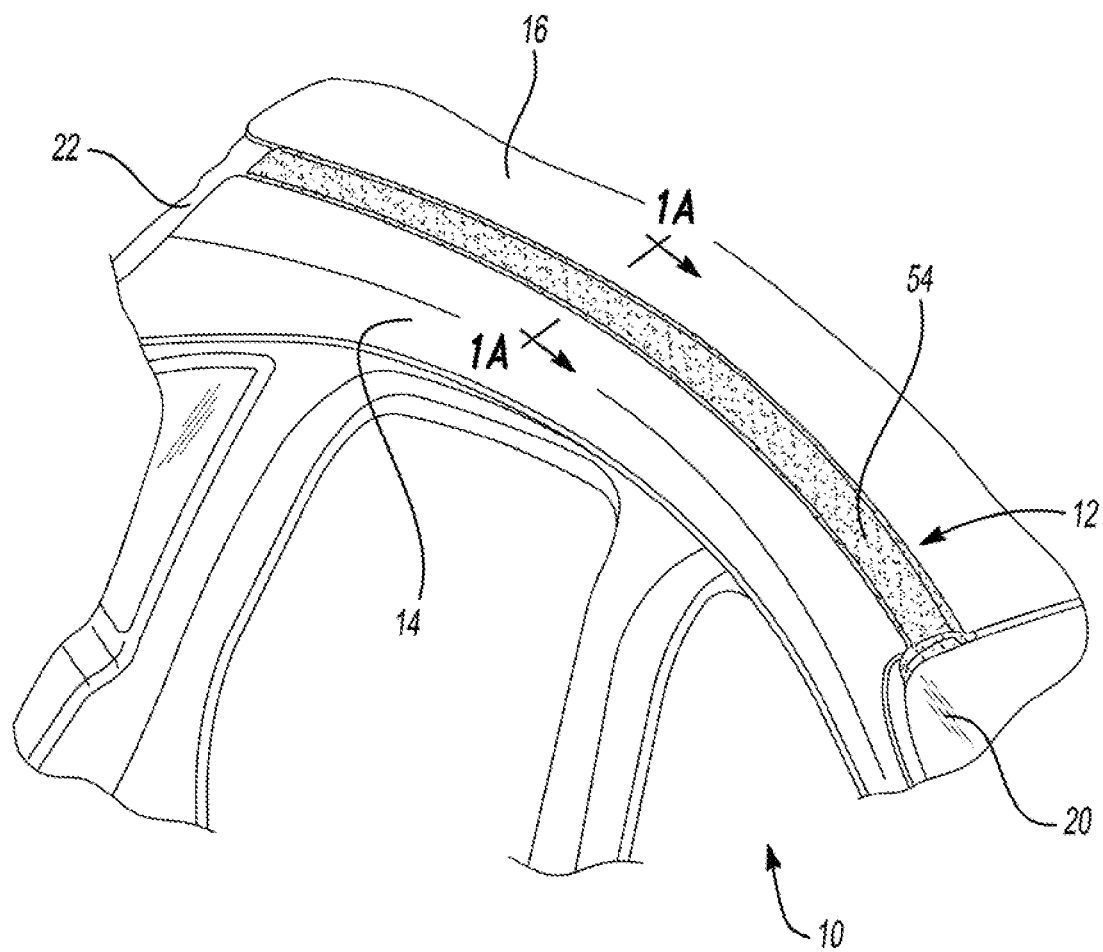
FIG. 1 is a partial perspective view of a vehicle having a roof ditch molding assembled into a roof ditch in accordance with one aspect of the disclosure.

For purposes of descriptive clarity, the present disclosure is described herein in the context of one or more specific vehicular applications, namely vehicle trim members, and in a particular non-limiting embodiment illustrated and discussed in more detail below, a roof ditch molding strip (RDM), by way of example and without limitation. Upon reading the following detailed description, in conjunction with the appended drawings and claims, it will be clear that the inventive aspects of the present disclosure can be applied to other systems and applications including vehicle trim members, also referred to herein as molding strips or moldings. "Coated", as used herein, is intended to include liquid polymeric materials applied and solidified to the metal substrate, such as in an extrusion or co-extrusion process, for example, solid polymeric materials bonded to the metal substrate, such as a sheet or sheets of solid polymeric material, by way of example and without limitation, polymeric materials sprayed onto the metal substrate, and the like, all by way of example and without limitation. A molding strip constructed in accordance with the disclosure can provide a trim member having a mar-resistant finish surface along a coated region of the trim member, wherein finish surface, as used herein, is intended to include a surface of a vehicle that is openly exposed and viewable in ordinary use, and a separate sealing feature in another coated area of the trim member, such that the separate areas of the trim member are multifunctional, sustain a long and useful life, while being economical in manufacture. These and other aspects of a metal coated substrate constructed in accordance with the disclosure will become readily apparent to one possessing ordinary skill in the art of coated vehicle trim members upon viewing the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "bonded to," "fixed to," "attached to," or "coupled to" another element or layer, it may be directly on, engaged, connected or coupled to the other element or layer, or intervening elements or layers may be present. In contrast, when an element is referred to as being "directly on," directly engaged to," "directly connected to," "directly bonded to," "directly fixed to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below, as would be recognized through use of common sense. The device may be otherwise oriented (rotated 90 degrees or at other orientations) and the spatially relative descriptors used herein interpreted accordingly.

Figure 1A:
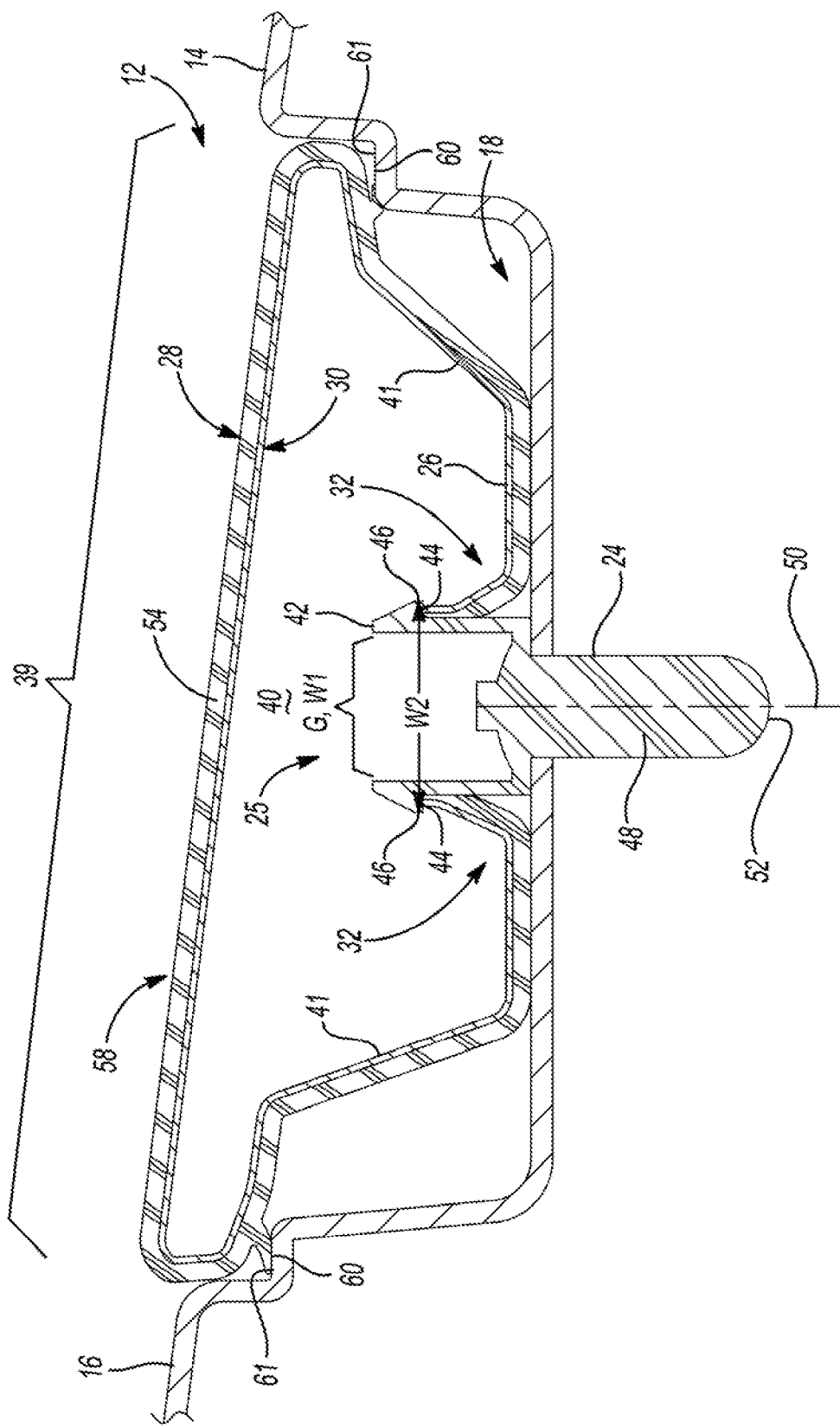
FIG. 1A is a cross-sectional view taken generally along the line 1A-1A of FIG. 1.
Figure 2:
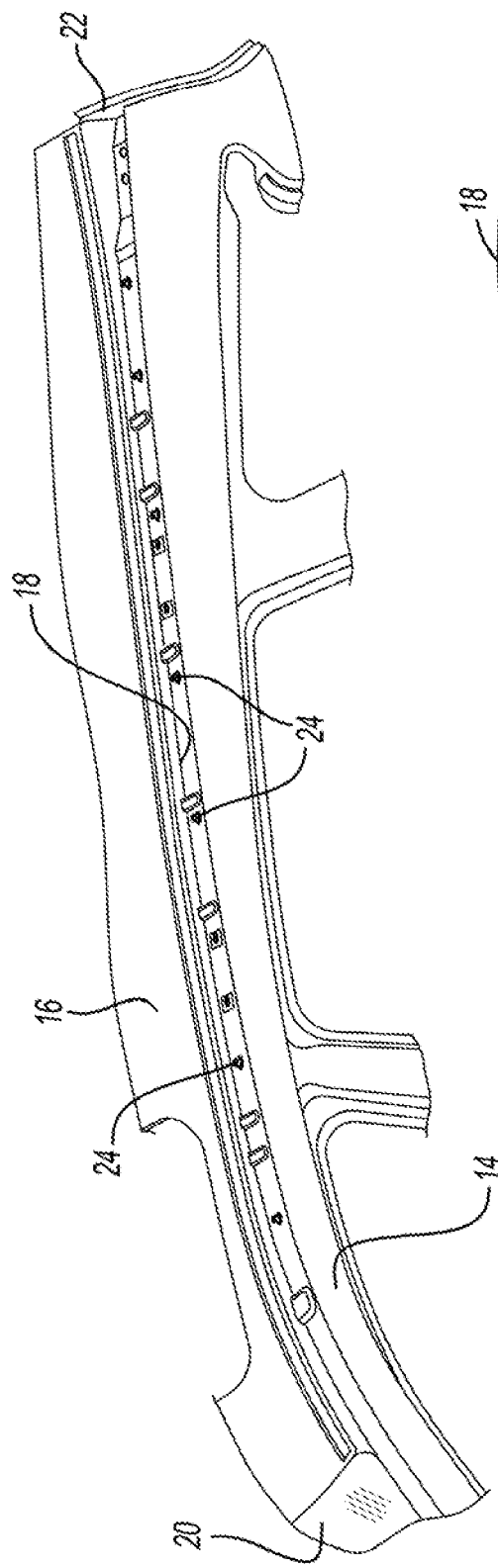
FIG. 2 is a partial perspective view of the vehicle of FIG. 1 prior to assembly of the roof ditch molding into the roof ditch.
Figure 2A:
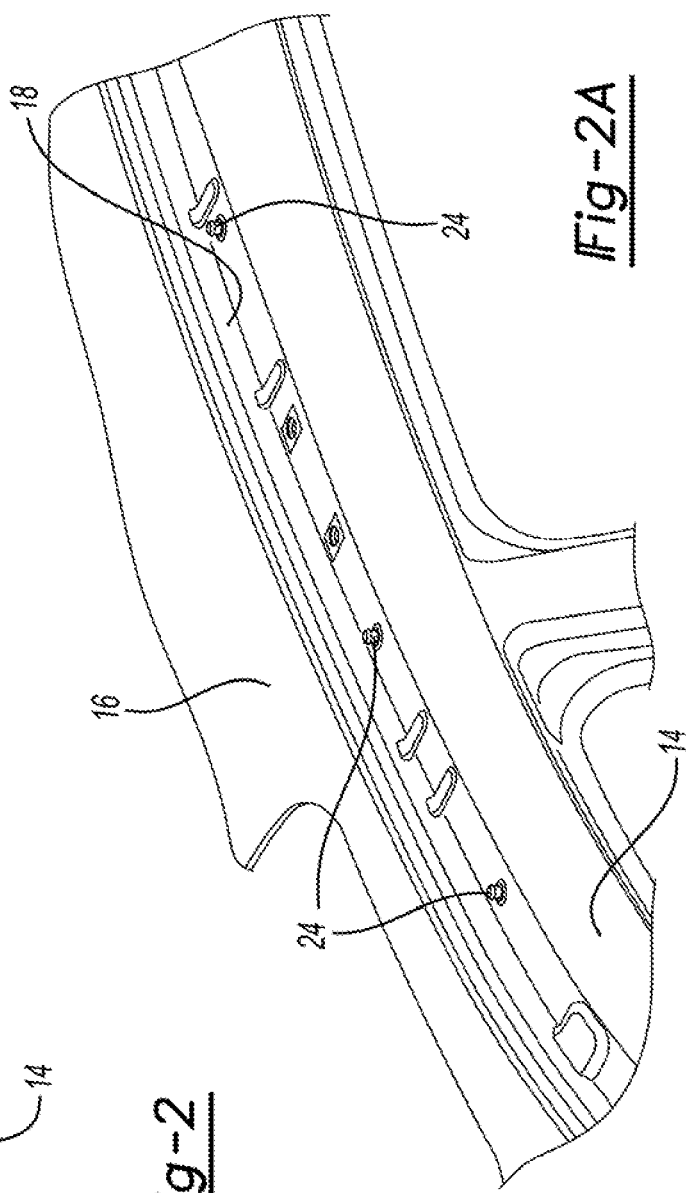
FIG. 2A is a fragmentary enlarged view of FIG. 2.

Now, referring in more detail to the drawings, in accordance with one aspect of the disclosure, a vehicle 10 includes a vehicle trim member, shown in a non-limiting aspect as a roof ditch molding 12, such as that used in an interface between a body side panel 14 and roof 16 of the vehicle 10. The interface between the side panel 14 and roof 16 generally form an elongate channel or trough, which is commonly referred to as "roof ditch" 18 (FIGS. 1A, 2 and 2A). The roof ditch 18 typically extends from a front portion of the roof 16 immediately adjacent a windshield 20 to a rear portion of the roof immediately adjacent a rear window or closure panel 22. It is to be recognized that the roof ditch molding 12 could be formed to take on a shape other than as shown, depending on the intended application. The roof ditch molding 12 is configured for fixed attachment within the roof ditch 18 via a plurality of fasteners 24 fixed within the roof ditch 18. The fasteners 24, typically being first fixed to the roof 16 (this is to be understood that the fasteners 24 could be fixed to one or both the side panel 14 and/or roof 16) to extend upwardly within the roof ditch 18 to a free end region 25 configured for snapping attachment to the roof ditch molding 12. Accordingly, the roof ditch molding 12 is considered "clipless" or otherwise free of fasteners, as no additional fasteners, other than the fasteners 24 fixed within the roof ditch 18, are required to fix the roof ditch molding 12 to the vehicle 10. Accordingly, assembly of the roof ditch molding 12 to the vehicle 10 is simplified and the costs associated therewith are minimized, as will be readily appreciated by the skilled artisan in view of the disclosure herein.

The roof ditch molding 12, in accordance with one aspect, includes a monolithic elongate metal substrate 26, such as made from a single piece of aluminum, stainless steel, or other desired metal. The elongate metal substrate 26 has an outer surface 28 and an inner surface 30 with opposite edge regions 32 extending along a direction of a longitudinal axis 34 between opposite ends 36, 38. The metal substrate 26 has an intermediate region 39 configured to form a portion of a roof line and remain outwardly exposed for viewing, whether directly if coated or indirectly if uncoated, as discussed in further detail below, and opposite sidewalls 41 extending in oblique relation from the intermediate region 39 in laterally spaced relation from one another, with the sidewalls 41 extending between the intermediate region 39 and the opposite edge regions 32. The opposite edge regions 32 extend from the sidewalls 41 upwardly toward the intermediate region 39 to free edges 44.

The metal substrate inner surface 30 faces and delimits an elongate channel 40 extending from one end 36 to the opposite end 38. The opposite edge regions 32 are spaced from one another by an open gap G, wherein the gap G has a width W1 configured and sized for snapping receipt of the free end regions 25 and a plurality of first ends 42 of the fasteners 24 therein, wherein the free end regions 25 have a width W2 that is greater than the width W1. To facilitate fixation of the roof ditch molding 12 within the roof ditch 18 and to facilitate snapping receipt of the fastener free end regions 25 beyond the opposite edge regions 32, the opposite edge regions 32 can be configured to converge toward one another to free edges 44. With the opposite edge regions 32 converging toward one another, they function as cam surfaces to enhance the ease with which the enlarged free end regions 25 and first ends 42 bias the opposite edge regions 32 in spring-like fashion away from one another during installation, whereupon the opposite edge regions 32 return resiliently toward one another upon the enlarged free end regions 25 and fastener first ends 42 passing beyond the free edges 44. As such, the free edges 44 capture the enlarged fastener first ends 42 against removal from the channel 40. To further enhance retention of the fastener first ends 42 within the channel 40, the fastener first ends 42 can be configured having one or more barbed shoulders 46 extending outwardly from one another, such that the shoulders 46 extend laterally over and become engaged with the free edges 44 in retained, confronting fashion. If an outward force is applied to the roof ditch molding 12, the shoulders 46 pull on the free edges 44, thereby tending to further bias the edge regions 32 inwardly toward one another, acting to further prevent removal of the fastener first ends 42 from the channel 40, as will be understood by the skilled artisan upon view the disclosure herein.

The roof ditch molding 12 and the plurality of fasteners 24 provide an assembly and mechanism for attached therebetween without need of further fastening features. The fasteners 24 each extend along a second longitudinal axis 50 between the first end 42 and an opposite second end 52, with the second end 52 and/or shank 48 (FIG. 1A) being configured for attachment to the vehicle roof 16 within the roof ditch 18 in any suitable fashion. The fasteners 24 can be fixed within the roof ditch 18 during any desired stage of assembly in advance of fixing the roof ditch molding 12 within the roof ditch 18. As such, at the desired manufacturing stage, with the fasteners 24 already fixed within the roof ditch 18, the roof ditch molding 12 need only be pressed over the fasteners 24 and within the roof ditch 18 to bring the fasteners 24 into fixed receipt within the channel 40 of the roof ditch molding 12, as discussed above. Accordingly, no secondary fastening features are needed to fix the clipless or otherwise fastener free roof ditch molding 12 within the roof ditch 18, as the edge regions 32 provide an integral fastening feature unto themselves. Additionally, assembly is further simplified in that the fasteners 24 need not be aligned with any supplemental fastening features, but rather, the fastener first ends 42 need only be pressed between the opposite edge regions 32 for receipt beyond any region of the free edges 44.

In accordance with another aspect of the disclosure, a polymeric material 54, such as a thermoplastic material, for example, polyvinylchloride, without limitation, can be bonded at to the outer surface 28 of the metal substrate 26. The polymeric material 54 is shown in a non-limiting embodiment as extending over the entirety of the outer surface 28, though it is contemplated that the polymeric material 54 could extend over less than the entirety thereof, if desired.

In accordance with another aspect of the disclosure, a pair of flexible wings, also referred to as seal lips 60, can be formed to extend lengthwise along the direction of the longitudinal axis 34 between the opposite ends 36, 38 and outwardly from the outer surface 28 of the metal substrate 26 to facilitate forming a seal between the roof ditch molding 12 and the roof ditch 18 of the vehicle 10. The seal lips 60 can be formed as a monolithic piece with the polymeric material 54, and thus, can be co-extruded or otherwise formed therewith, such as via a molding process, by way of example and without limitation. The seal lips 60 are shown being brought into engagement with a respective seat portion of the side panel 14 and roof 16 to prevent the ingress of water into the ditch 18, thereby inhibiting the onset of leaks into an interior cabin of the vehicle 10. It is contemplated herein that the seal lips 60 could be configured differently than shown, and further yet, that more or fewer seal lips could be provided, including none at all, if desired.

Figure 3:
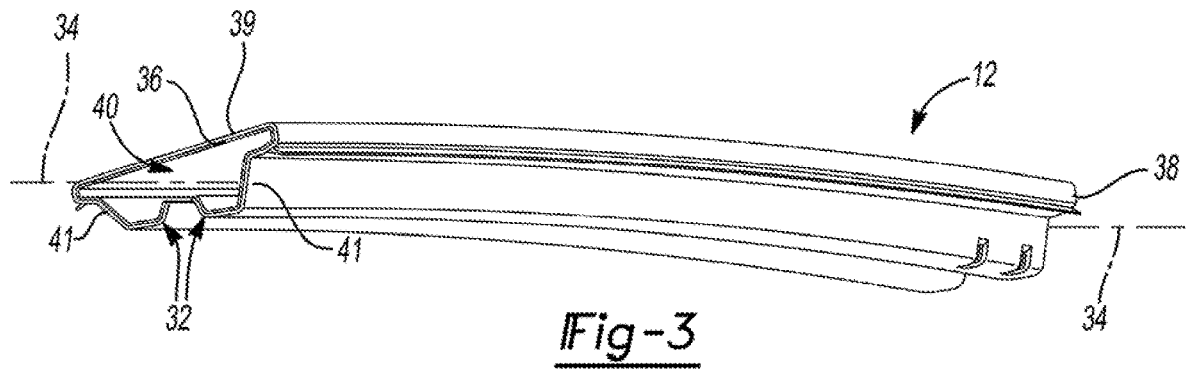
FIG. 3 is a perspective view of the roof ditch molding in accordance with one aspect of the disclosure.
Figure 3A:
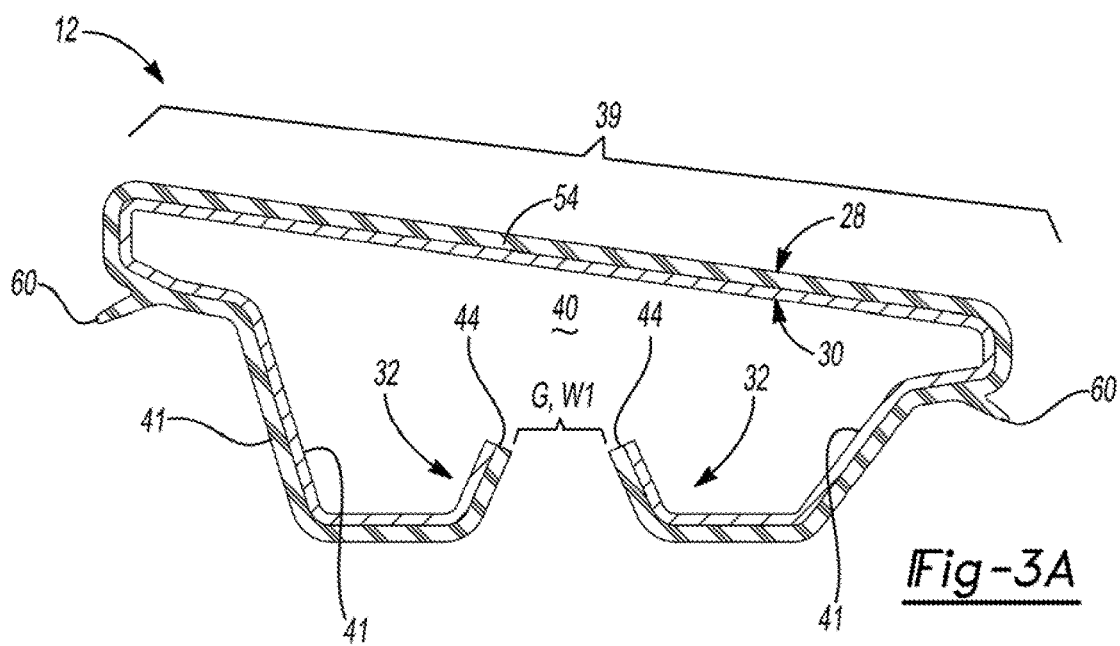
FIG. 3A is a lateral cross-sectional view of the roof ditch molding of FIG. 3.
Figure 4:
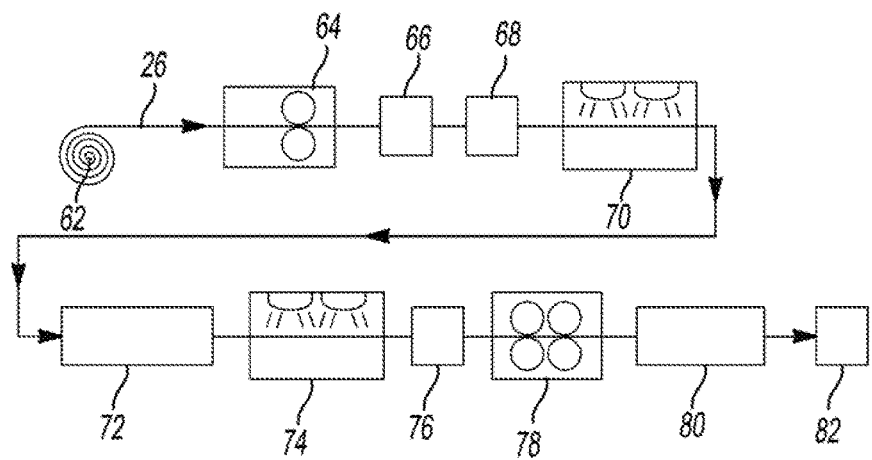
FIG. 4 is a process flow diagram in accordance with one aspect of the disclosure.

In manufacture, the coated metal substrate 10 can be made, by way of example and without limitation, via process steps illustrated in FIG. 4. Depending on the intended application, the desired type of metal substrate 26, such as aluminum or stainless steel, for example, can be unwound from a spool at an uncoiling station 62. The metal substrate 26 can then be advanced through a roll forming station 64, wherein the metal substrate 26 is formed gradually into a non-planar finish shape by guide rollers to take on the desired finish shape of the roof ditch molding 12, such as shown in FIGS. 1A, 3 and 3A, by way of example and without limitation. Then, the formed metal substrate 26 can be sent through a straightening station 66, whereupon the formed substrate 26 is further formed to resist a phenomenon known as spring back. Further, the formed metal substrate 26 can then be sent through an air drying station 68, wherein any water based oil remaining from the upstream roll forming station 64 is dried. Next, the dried metal substrate 26 can then be sent through a cleaning station 70, such as a steam and detergent cleaning station, by way of example and without limitation. The foregoing steps are all preferably performed to facilitate bonding of the polymeric material 54, if provided, to the metal substrate 26, as discussed hereafter.

Upon preparing the formed metal substrate 26, as discussed above, the substrate 26 can then be transferred in-line to an extrusion station 72. At the extrusion station, the polymeric material 54 is extruded onto the selected area of the metal substrate 26, and is preferably extruded having a finish shape (intended to mean no further processing is needed, and that the "as extruded" polymeric material 54 attains its intended in-use configuration) directly onto the selected area of the outer surface 28 and/or inner surface 30, if desired. The polymeric material 54, by way of example and without limitation, can be provided as thermoplastic, such as polyvinylchloride (PVC), though other thermoplastic materials are contemplated herein.

Then, after bonding the polymeric material 54 to the metal substrate 26, the metal substrate 26 can be sent to a washing and cooling station 74. At the washing and cooling station 74, cold water or other suitable cold fluid or medium can be used to cool the extruded polymeric material 54.

Then, the coated metal substrate 26 can be sent to an inspection station 76, where the coated metal substrate 26 can be inspected via any suitable inspection mechanism, including automated visual inspection equipment, by way of example and without limitation.

Then, the coated metal substrate 26 continues along to a tensioning station 78, whereupon the coated metal substrate 26 can be fed through rollers of the tensioning station 78 that maintain a select tension on the substrate 26 to advance the substrate 26, as least in part, throughout the continuous process.

Further, the coated metal substrate 26 can then be sent to a cutting station 80, whereat the coated substrate 26 is cut to the desired length and configuration for the intended roof ditch molding 12 application. Thereafter, the finished, roof ditch molding 12 can be sent to a sorting station 82 and stored.

It is to be recognized that the above manufacture process is intended to be a continuous, efficient and economical process.

In accordance with another aspect of the disclosure, a method assembling a roof ditch molding 12 in a roof ditch 18 of a vehicle 10 is provided. The method includes providing an elongate metal substrate 26 having an inner surface 30 and an outer surface 28 extending along a direction of a longitudinal axis 34 between opposite ends 36, 38, with the inner surface 30 delimiting an elongate channel 40 extending between the opposite ends 36, 38. Further, providing the elongate metal substrate 26 having an intermediate region 39 and opposite sidewalls 41 extending away from the intermediate region 39 in laterally spaced relation from one another to opposite edge regions 32. Further, providing the opposite edge regions 32 extending from the opposite sidewalls 41 toward the intermediate region 39, with the opposite edge regions 32 being spaced from one another a first width W1. The method further includes fixing a plurality of fasteners 24 within the roof ditch 18, with each of the fasteners 24 extending to a free end region 25. The method then includes pressing the elongate metal substrate 26 into the roof ditch 18 and snapping at least a portion of the free end regions 25 of the plurality of fasteners 24 between the opposite edge regions 32 and into the elongate channel 40 to fixedly retain the elongate metal substrate 26 within the roof ditch 18.

The foregoing description of the embodiments has been provided for purposes of illustration and description. It is not intended to be exhaustive or to limit the disclosure or claims. Individual elements or features of a particular embodiment are generally not limited to that particular embodiment, but, where applicable, are interchangeable and can be used in a different embodiment, even if not specifically shown or described. Many modifications and variations to the above embodiments, and alternate embodiments and aspects are possible in light of the above disclosure. Such variations are not to be regarded as a departure from the disclosure, and all such modifications are intended to be included within the scope of the disclosure. The modifications and variations to the above embodiments, alternate embodiments, and aspects may be practiced otherwise than as specifically described while falling within the scope of the following claims.

What is claimed is:

1. A method of constructing a roof ditch molding, comprising:
    forming an elongate metal substrate in an extrusion process to include an outer surface and an inner surface with opposite edge regions extending along a direction of a first longitudinal axis between opposite ends;
    forming the inner surface to face and delimit an elongate channel extending between the opposite ends; and
    spacing the opposite edge regions from one another for resilient snapping receipt of an end of a fastener therebetween into the elongate channel.

2. A method of constructing a roof ditch molding, comprising:
    forming an elongated metal substrate having an outer surface and an inner surface with opposite edge regions extending along a direction of a first longitudinal axis between opposite ends, the elongate metal substrate being formed in a roll forming process;
    forming the inner surface to face and delimit an elongated channel extending between the opposite ends; and
    spacing the opposite edge regions from one another for resilient snapping receipt of an end of a fastener therebetween into the elongated channel.

3. The method of claim 1, further including bonding a polymeric material to the outer surface of the elongate metal substrate.

4. The method of claim 3, further including extruding a pair of seal lips extending between the opposite ends and outwardly from the outer surface of the wall from the polymeric material.

5. A method of constructing a roof ditch molding, comprising:
    forming an elongated metal substrate having an outer surface and an inner surface with opposite edge regions extending along a direction of a first longitudinal axis between opposite ends;
    forming the inner surface to face and delimit an elongated channel extending between the opposite ends; and
    spacing the opposite edge regions from one another for resilient snapping receipt of an end of a fastener therebetween into the elongated channel,
    wherein the elongate metal substrate has an intermediate region and opposite sidewalls extending away from the intermediate region in laterally spaced relation from one another to opposite edge regions.

6. The method of claim 5 further including fixing a plurality of the fasteners within a roof ditch of a vehicle, with the fasteners extending to free end regions.

7. The method of claim 6 further including pressing the elongate metal substrate into the roof ditch and snapping at least a portion of the free end regions of the plurality of fasteners between the opposite edge regions and into the elongate channel.

8. The method of claim 7 further including deflecting the opposite edge regions resiliently outwardly away from one another with the free end regions of the fasteners and extending the free end regions of the fasteners beyond the opposite edge regions to allow the opposite edge regions to spring resiliently inwardly toward one another to capture the end regions of the fasteners in the elongate channel and retain the elongate metal substrate in fixed relation within the roof ditch.

9. The method of claim 7 further including fixing the elongate metal substrate to the fasteners without supplemental fastening features.

10. The method of claim 2, further including bonding a polymeric material to the outer surface of the elongated metal substrate.

11. The method of claim 10, further including bonding the polymeric material to the outer surface of the elongated metal process during the extrusion process.

12. The method of claim 10, further including forming a pair of seal lips extending between the opposite ends and outwardly from the outer surface of the wall from the polymeric material.

13. A method of constructing a roof ditch molding, comprising:
    forming an elongated metal substrate having an outer surface and an inner surface with opposite edge regions extending along a direction of a longitudinal axis between opposite ends;
    forming the inner surface to face and delimit an elongated channel extending between the opposite ends;
    spacing the opposite edge regions from one another for resilient snapping receipt of an end of a fastener therebetween into the elongated channel;
    bonding a polymeric material to the outer surface of the elongated metal substrate; and
    forming pair of seal lips extending between the opposite ends and outwardly from the outer surface of the wall from the polymeric material.

* * * * *